United States Patent
Gardner et al.

(10) Patent No.: US 11,233,897 B1
(45) Date of Patent: *Jan. 25, 2022

(54) SECURE CALL CENTER COMMUNICATIONS

(71) Applicant: Wells Fargo Bank, N.A., San Francisco, CA (US)

(72) Inventors: Joel Gardner, Charlotte, NC (US); Christopher Robin Sharpe, Charlotte, NC (US); Daniel S. Sumner, Matthews, NC (US); Douglas Innocenti, Huntersville, NC (US); Joseph Benjamin Agnew, Charlotte, NC (US); Kevin Potter, Charlotte, NC (US); Michael J. Martindale, San Francisco, CA (US); Raymond Creed Lowers, Harrisburg, NC (US); Wesley Donald Duncan, Charlotte, NC (US); Zoe Tierney, Chevy Chase, MD (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/882,046

(22) Filed: May 22, 2020

Related U.S. Application Data

(63) Continuation of application No. 15/899,209, filed on Feb. 19, 2018, now Pat. No. 10,666,793.

(51) Int. Cl.
*H04M 3/38* (2006.01)
*H04W 4/16* (2009.01)
(Continued)

(52) U.S. Cl.
CPC .............. *H04M 3/385* (2013.01); *H04W 4/16* (2013.01); *H04W 8/183* (2013.01); *G06Q 20/40* (2013.01); *H04W 12/12* (2013.01)

(58) Field of Classification Search
CPC ...... H04M 3/385; H04M 3/38; H04M 3/2281; H04M 3/42059; H04M 2203/6054;
(Continued)

(56) References Cited

U.S. PATENT DOCUMENTS 6,343,073 B1 * 1/2002 Mashinsky .............. H04Q 3/66
                                                                370/352
9,064,259 B2    6/2015 Aleksin et al.
(Continued)

FOREIGN PATENT DOCUMENTS

WO    2017102098 A1    6/2017

OTHER PUBLICATIONS

"In-app Customer Service Delivers a Human Experience When its Needed Most," retrieved on or about Sep. 25, 2017 from https://get.gotoassist.com/resource-center/documents-and-reports/in-app-customer-service-delivers-human-experience, 4 pp.

(Continued)

*Primary Examiner* — Akelaw Teshale
(74) *Attorney, Agent, or Firm* — Shumaker & Sieffert, P.A.

(57) ABSTRACT

This disclosure describes techniques for authenticating a person that seeks to engage in a voice call session with a call center agent, an interactive voice response system, or other system. In one example, this disclosure describes a method that includes storing information associating an authorized device with an account; receiving, over a network and from a device operated by a user, authentication credentials for the user; determining, based on the authentication credentials, that the user is authorized to access the account; receiving, over the network and from the device operated by the user, a request to engage in a voice conversation; responsive to receiving the request, accessing the phone number associated with the authorized device; and initiating a voice call (Continued)

session by placing a call, over the network, to the phone number associated with the authorized device.

20 Claims, 6 Drawing Sheets

(51) Int. Cl.
*H04W 8/18* (2009.01)
*G06Q 20/40* (2012.01)
*H04W 12/12* (2021.01)

(58) Field of Classification Search
CPC .. H04M 3/382; H04M 3/42042; H04M 3/436; H04M 1/67; H04M 2201/41; H04M 3/2218; H04M 3/42221; H04M 3/42263; H04M 1/677; H04M 2203/558; H04M 3/42102; H04M 1/72457; H04M 2201/42; H04M 2203/305; H04M 3/20; H04M 3/42025; H04M 15/58; H04M 1/2757; H04M 1/57; H04M 7/006; H04M 15/60; H04M 3/4365; H04M 15/852; H04M 17/305; H04M 1/575; H04M 1/673; H04M 1/7243; H04M 1/72448; H04M 2201/40; H04M 2203/5054; H04M 2242/12; H04M 2250/02; H04M 3/4211; H04M 3/42255; H04M 3/42272; H04M 3/565; H04M 7/0078; H04M 7/1295; H04M 1/2746; H04M 1/56; H04M 1/6075; H04M 1/6091; H04M 1/663; H04M 2250/60; H04M 3/42068; H04M 3/42093; H04M 3/42153; H04M 3/42161; H04M 3/42195; H04M 3/42314; H04M 3/4931; H04M 3/543; H04M 7/0069; H04M 15/62; H04M 15/705; H04M 15/723; H04M 15/735; H04M 15/7556; H04M 15/765; H04M 15/80; H04M 15/84; H04M 15/844; H04M 15/848; H04M 15/856; H04M 1/72406; H04M 1/72445; H04M 2203/2005; H04M 2203/2011; H04M 2203/6045; H04M 2203/651; H04M 2203/655; H04M 2215/0188; H04M 2215/8158; H04M 3/42204; H04M 3/42357; H04M 3/42365; H04M 3/465; H04M 3/5183; H04M 7/0012; H04M 7/0021; H04M 7/0033; H04M 7/0042; H04M 7/0057; H04M 15/7652; H04M 15/8083; H04M 15/83; H04M 15/85; H04M 1/006; H04M 1/675; H04M 1/72412; H04M 1/72424; H04M 1/72502; H04M 2203/60; H04M 2203/6027; H04M 2203/6063; H04M 2207/18; H04M 2250/06; H04M 2250/08; H04M 2250/14; H04M 3/42; H04M 3/42034; H04M 3/4234; H04M 3/46; H04M 3/4878; H04M 3/5175; H04M 3/54; H04M 3/546; H04M 7/0075; H04M 7/125; H04M 7/126; H04M 11/04; H04M 15/41; H04M 15/47; H04M 15/59; H04M 1/0254; H04M 1/72418; H04M 1/72451; H04M 1/72463; H04M 1/72475; H04M 2203/2027; H04M 2203/2038; H04M 2203/2044; H04M 2203/6072; H04M 2203/6081; H04M 2207/182; H04M 2242/04; H04M 2242/22; H04M 2242/30; H04M 17/10; H04M 1/642; H04M 2215/7222; H04W 4/16; H04W 8/183; H04W 12/12; G06Q 20/40
See application file for complete search history.

(56) References Cited

U.S. PATENT DOCUMENTS

| | | |
|---|---|---|
| 9,516,126 B1 | 12/2016 | Montenegro et al. |
| 9,749,463 B1 | 8/2017 | Farnsworth et al. |
| 10,666,793 B1 | 5/2020 | Gardner et al. |
| 2007/0011104 A1 | 1/2007 | Leger et al. |
| 2007/0294354 A1* | 12/2007 | Sylvain ............... H04M 7/003 709/206 |
| 2009/0156222 A1* | 6/2009 | Bender ............... H04L 65/1013 455/445 |
| 2014/0376705 A1* | 12/2014 | Layman ............ H04M 3/42314 379/114.14 |
| 2015/0094026 A1* | 4/2015 | Martin .................... H04L 63/08 455/411 |
| 2016/0021255 A1* | 1/2016 | Weldon ............. H04M 3/42272 455/411 |
| 2016/0370952 A1 | 12/2016 | Karnewar |
| 2018/0241884 A1* | 8/2018 | Converse ............ H04L 65/1053 |

OTHER PUBLICATIONS

Kim, "Rebtel gives apps a voice with new developer platform," Dec. 11, 2012, 2 pp. (retrieved from https://gigaom.com/2012/12/11/rebtel-gives-apps-a-voice-with-new-developer-platform/).
"Add voice, instant messaging and video to your websites, mobile apps and desktop programs," accessed from Zoiper.com on or about Sep. 25, 2017, 2 pp.
Prosecution History from U.S. Appl. No. 15/889,209, dated Jul. 27, 2018 through Jan. 23, 2020, 91 pp.

* cited by examiner

SECURE CALL CENTER COMMUNICATIONS

CROSS REFERENCE

This application is a continuation application of and claims priority to U.S. patent application Ser. No. 15/899,209 filed on Feb. 19, 2018, which is hereby incorporated by reference herein in its entirety.

TECHNICAL FIELD

This disclosure relates to authenticated communications on a network, and more specifically, to authenticating a user and/or device involved in a voice call session on a network.

BACKGROUND

A call center is a facility for handling incoming voice calls from customers or potential customers of a business or organization. Typically, a call center is staffed with a number of agents, often located in the same office, that are representatives of a business and have access to information about the business or about existing customers of that business. One function of the call center is to handle customer service inquiries from customers. Although many customer service inquiries can be handled by email or by publishing information online, for some businesses, a call center may be regarded as necessary. Customers of banks, for example, often prefer to speak to a live person when resolving service issues.

Call centers tend to be the target of fraud. For example, existing call centers sometimes validate or authenticate customers using basic information, such as account number, phone number, address, date of birth, and the last four digits of a Social Security number. Often this information is available to a sufficiently motivated perpetrator seeking to fraudulently gain access to information about an account. Further, contact centers are susceptible to social engineering techniques, where a small amount of information about an account is used by a perpetrator to gain access to additional information about the account. Publicly-available information, along with other information gained through social engineering techniques, may be sufficient to enable a person not authorized to access information about an account to persuade a call center agent that he or she is the authorized user on the account.

SUMMARY

This disclosure describes techniques for authenticating a person that seeks to engage in a voice call session with a call center agent, an interactive voice response system, or other system. Traditional incoming voice calls to a call center provide opportunities for a caller to hide his or her identity and/or provide misleading information about the origin of the call. Techniques in accordance with one or more aspects of the present disclosure may foreclose at least some of those opportunities by ensuring that call sessions take place within a controlled environment or configuration. For instance, in some examples, a user of a mobile phone (or other device) may use an application, executing on the mobile phone, that is developed by, administered by, or otherwise under the control of the call center (or an organization associated with the call center). In some examples, such an application may have an authentication procedure, and therefore the security of any calls made from within or under control of the application may benefit from that authentication procedure.

Further, when the user uses the application to indicate an interest in engaging in a voice call session with the call center, a voice session could be configured as a Voice Over IP (VOIP) call. A VOIP call may enable hardware attributes of the user's phone, as well as the IP address associated with the phone, to be made available to the call center, thereby providing information that could be used to verify the authenticity of the incoming VOIP call. Still further, in some examples, the VOIP session may be configured so that, in response to a request by a user of a mobile phone to engage in a voice call session with the call center, it is actually the call center that initiates the VOIP call to the mobile phone, rather than the mobile phone initiating a call to the call center. Arranging the call in this way provides security and operational advantages, because the call center may have more control over the call. One security advantage is that the call center might be able to ensure that the call is being placed to a "bound" device, or one that the call center recognizes and/or has been previously verified as being associated with the user or an account. Further, the call center can circumvent various attempts that might be made by the caller to hide his or her identity or that of the device being used, such as using a virtual private network or other arrangement to spoof the IP address of the user's device. One operational advantage is that since the call center initiated the call, the call center may be able exercise more control over how the call is handled, thereby potentially enabling capabilities for call transfers, re-routing, and reconnection with specific call center agents.

In one example, this disclosure describes a method comprising storing, by a computing system, information associating an authorized device with an account, wherein the information includes a phone number associated with the authorized device; determining, by the computing system and based on information received over a network from a device operated by a user, that the user is authorized to access the account; receiving, by the computing system over the network and from the device, a request to engage in a voice conversation, wherein the request to engage in a voice conversation is generated by the device in response to call request input detected by the device; responsive to receiving the request, accessing, by the computing system, the phone number associated with the authorized device; initiating, by the computing system, a voice session with the authorized device, wherein initiating the voice session includes placing a call, over the network, to the phone number associated with the authorized device; receiving, over the network and by the authorized device, an indication of the call; and responsive to receiving the indication of the call, evaluating, by the authorized device, whether the device operated by the user is the authorized device.

In another example, this disclosure describes a system comprising an authorized device; and a computing system configured to perform operations comprising: storing information associating an authorized device with an account, wherein the information includes a phone number associated with the authorized device, determining, based on information received over a network from a device operated by a user, that the user is authorized to access the account, receiving, over the network and from the device, a request to engage in a voice conversation, wherein the request to engage in a voice conversation is generated by the device in response to call request input detected by the device, responsive to receiving the request, accessing the phone number associated with the authorized device, and initiating a voice session with the authorized device, wherein initiating the voice session includes placing a call, over the network, to the phone number associated with the authorized device, wherein the authorized device is configured to perform operations comprising: receiving, over the network, an indication of the call, and responsive to receiving the indication of the call, evaluating whether the device operated by the user is the authorized device.

In another example, this disclosure describes a computing system comprising a storage system and processing circuitry, wherein the processing circuitry is configured to access the storage system and perform operations comprising: storing information associating an authorized device with an account, wherein the information includes a phone number associated with the authorized device; determining, based on information received over a network from a device operated by a user, that the user is authorized to access the account; receiving, over the network and from the device, a request to engage in a voice conversation, wherein the request to engage in a voice conversation is generated by the device in response to call request input detected by the device; responsive to receiving the request, accessing the phone number associated with the authorized device; initiating a voice session with the authorized device, wherein initiating the voice session includes placing a call, over the network, to the phone number associated with the authorized device; enabling the authorized device to receive, over the network, an indication of the call; and enabling the authorized device to, responsive to receiving the indication of the call, evaluate whether the device operated by the user is the authorized device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
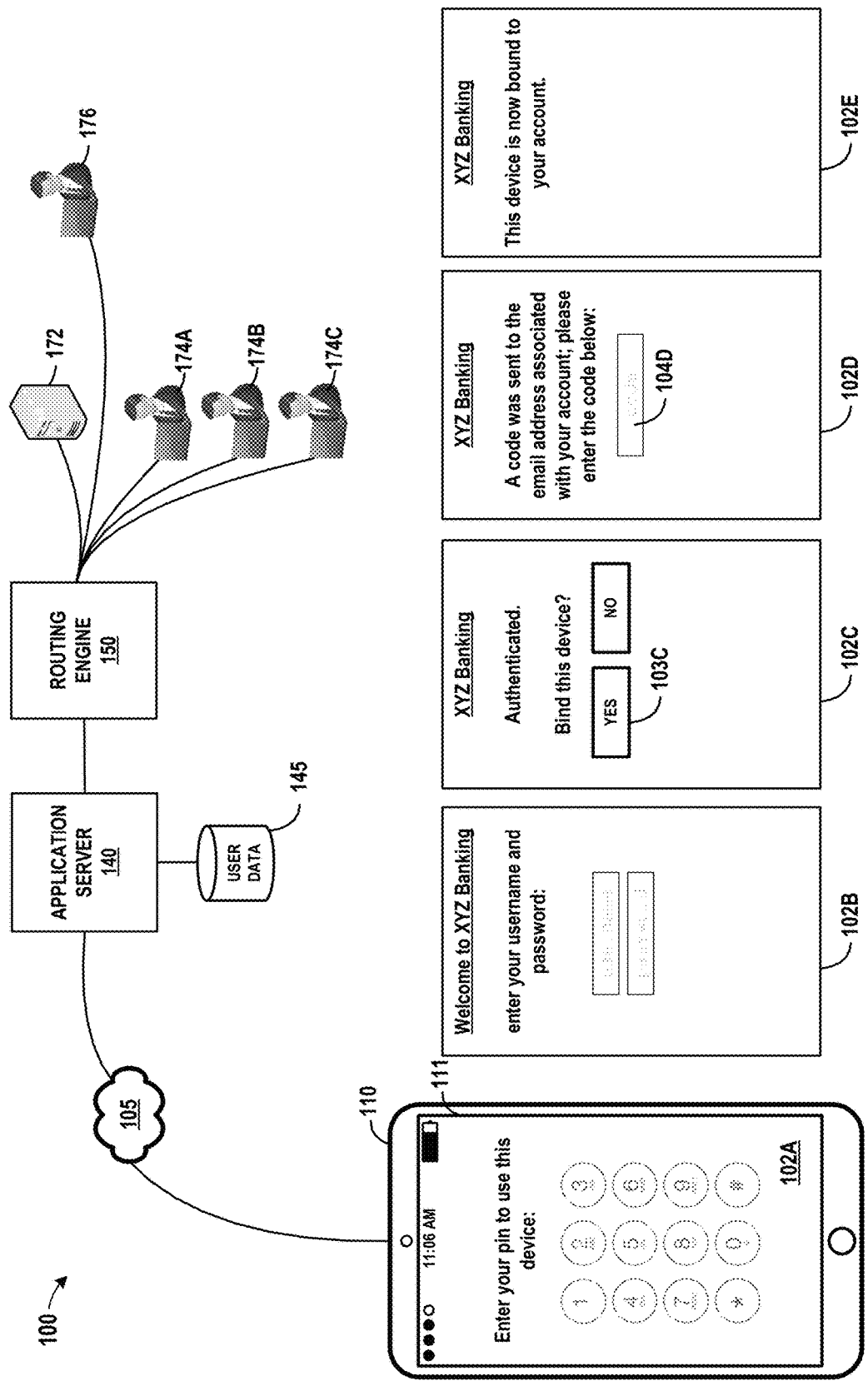
FIG. 1A and FIG. 1B are conceptual diagrams illustrating example systems for establishing a voice call session between a computing device and a call center, in accordance with one or more aspects of the present disclosure.
Figure 1B:
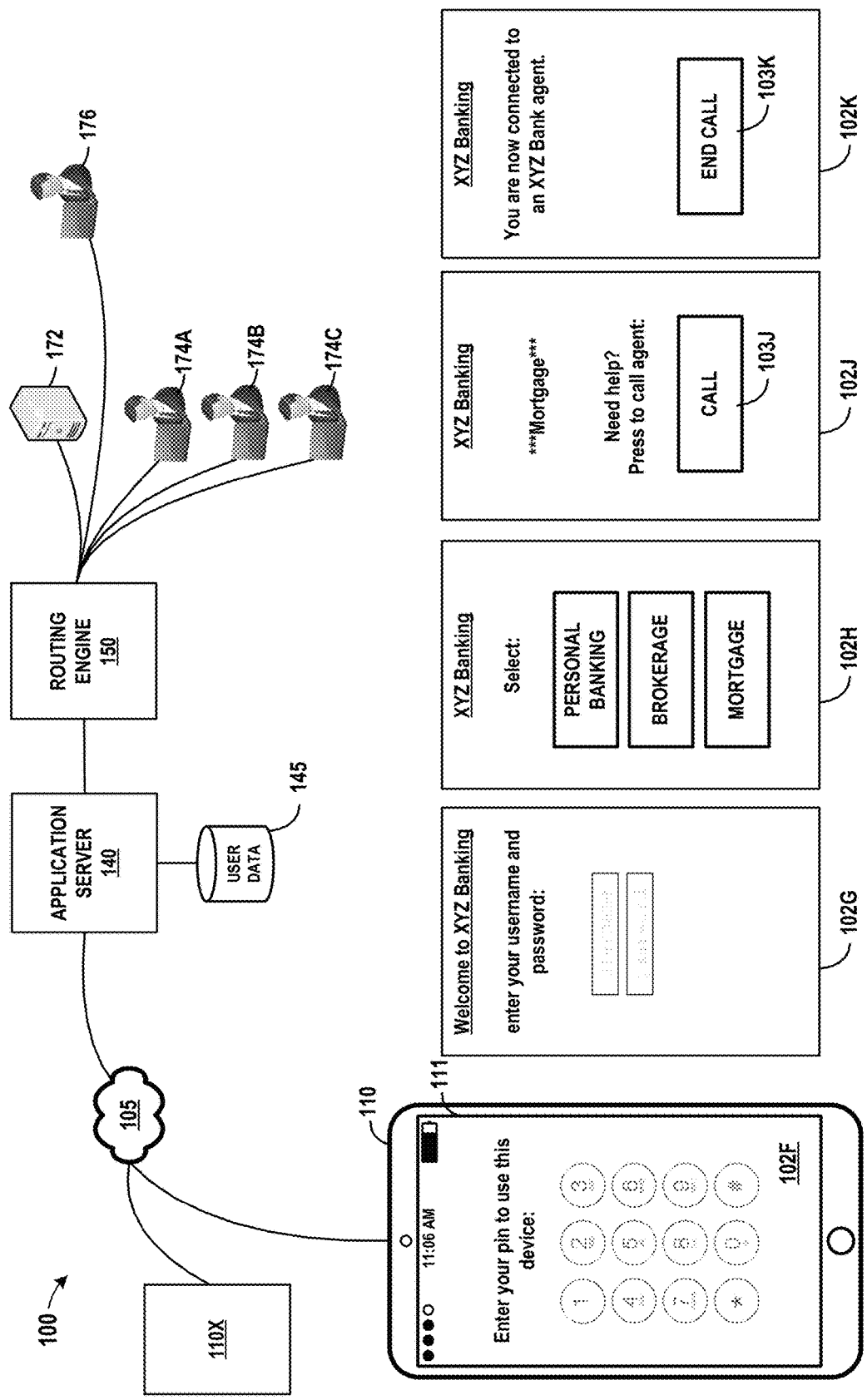

FIG. 1A and FIG. 1B are conceptual diagrams illustrating example systems for establishing a voice call session between a computing device and a call center, in accordance with one or more aspects of the present disclosure. In the examples of FIG. 1A and FIG. 1B, system 100 includes device 110 in communication, over network 105, with application server 140 and routing engine 150. Application server 140 has access to data store 145 either directly or over network 105. Routing engine 150 is capable of routing calls to interactive voice response system 172, one or more agents 174, or third party agent 176. In some examples described herein, application server 140 and routing engine 150 are operated, administered, or otherwise under the control of a financial institution (i.e. "XYZ Bank").

Application server 140 may be implemented through any suitable computing system, such as one or more server computers, mainframes, workstations, cloud computing systems, server farms, or server clusters. In some examples, application server 140 may be an application server capable of performing functions on behalf of one or more communication devices, such as mobile phones, smartphones, or other mobile computing devices. Application server 140 may be operated or controlled by a service provider, a financial institution, and/or other entity, and may, for example, provide mobile banking or financial services. Application server 140 may include a call routing interface that is used to interact (e.g., through a Java API or other API) with routing engine 150 to cause routing engine 150 to perform functions on behalf of call application server 140 and/or one or more devices 110. In some examples such an interface may be implemented using, for example, a CafeX Mobile Advisor solution from CafeX Communications, Inc. Application server 140 may be configured to implement communications protocols and/or application programming interfaces ("APIs") that enable real-time communication over peer-to-peer connections. One example of such protocols is WebRTC, now being standardized by the World Wide Web Consortium (W3C) and the Internet Engineering Task Force (IETF).

Routing engine 150 may represent a call routing system or call center system that may operate and/or perform functions in response to interactions with application server 140 or other devices or systems of system 100. In some examples, routing engine 150 may be implemented using call routing solutions available through Genesys Telecommunications Laboratories. Further, in some examples, routing engine 150 may initiate calls on behalf of application server 140. Routing engine 150 may route calls to one of a number of destinations, including to agents 174, interactive voice response system 172, and/or third party agent 176.

In both FIG. 1A and FIG. 1B, device 110 may present various example user interfaces 102. FIG. 1A illustrates user interface 102A through 102E. FIG. 1B illustrates user interfaces 102F through 102K. FIG. 1B also includes system 100X, which may be a device used by a person or organization seeking to fraudulently gain access to information and/or perpetrate a fraud by engaging in a voice conversation with interactive voice response system 172, one or more agents 174, or third party agent 176.

In the example of FIG. 1A, and in accordance with one or more aspects of the present disclosure, device 110 may authorize a user to use device 110. For instance, referring to FIG. 1A, device 110 detects input that it determines corresponds to a request to gain access to, unlock, or use device 110. Device 110 presents user interface 102A at display 111 requesting that the user enter a pin number. Device 110 detects input that it determines corresponds to a correct pin number. In response, device 110 enables access to device 110. In other examples, device 110 may unlock or otherwise enable access to device 110 based on other types of input, such as a fingerprint analysis, facial recognition, and/or any other input types now known or hereafter devised.

Device 110 may determine that the user is an authenticated user of an account at XYZ Bank. For example, still referring to FIG. 1A, device 110 detects input that it determines corresponds to a request to perform banking functions. In some examples, device 110 may interpret the input as a request to start a banking application distributed by or associated with XYZ Bank and stored on device 110. In response to the input, device 110 presents user interface 102B, requesting authentication credentials. Device 110 detects input that it determines corresponds to authentication credentials. Device 110 outputs a signal over network 105. Application server 140 detects a signal over network 105 and determines that the signal includes authentication credentials for a user of device 110. Application server 140 accesses data store 145 and determines, based on the authentication credentials, that the user of device 110 is an authorized user for an account at XYZ Bank that is maintained by application server 140.

Application server 140 may inform the user that he or she has been authenticated. For instance, again referring to FIG. 1A, application server 140 outputs a signal over network 105. Device 110 detects a signal over network 105 and determines that the signal includes information sufficient to present user interface 102C. Device 110 causes display 111 to present user interface 102C, informing the user that he or she has been authenticated. User interface 102C further invites the user to associate or "bind" device 110 to the user's account. In some examples, binding a device to an account is a way to designate a specific hardware device as "authorized" or known to be used by the authorized user of the account.

Application server 140 may determine that the user seeks to bind device 110 to an account at XYZ Bank. For instance, device 110 detects input that it determines corresponds to a user's selection of button 103C within user interface 102C. Device 110 outputs a signal over network 105. Application server 140 detects a signal over network 105 and determines that the signal corresponds to a request to bind device 110 to the user's account.

Application server 140 may use two-factor authentication to bind device 110 to the user's account. For instance, in the example of FIG. 1A, application server 140 accesses data store 145 and identifies an email address associated with the user's account. Application server 140 generates a code and sends an email over network 105 directed to the email address associated with the user's account. Application server 140 outputs another signal over network 105. Device 110 detects a signal over network 105 and based on the signal, presents user interface 102D. User interface 102D invites the user to enter in input box 104D a code emailed to the email address associated with the account. Device 110 detects input that it determines corresponds to a code being entered within input box 104D, perhaps after the user gains access to the code by successfully logging into his or her email account (e.g., using device 110 or another device). Device 110 outputs a signal over network 105. Application server 140 detects a signal over network 105 and determines that the signal includes an indication of a code entered in input box 104D. Application server 140 determines that the code matches the code emailed to the email address associated with the user's account. Application server 140 further determines that the signal received from device 110 (or an earlier signal) includes information identifying device 110, such as a unique identifier for the hardware of device 110. In some examples, the unique identifier may be a media access control address (i.e., MAC address) associated with a network interface circuitry included within device 110, or a hardware identifier derived from the MAC address. Application server 140 concludes that device 110 is device that, in at least one instance, was properly used by the user to access to the user's account, and is therefore not likely to be used to fraudulently gain access to that user's account.

Application server 140 may store information about the bound device. For instance, in the example of FIG. 1A, application server 140 stores the hardware identifier in data store 145. Application server 140 may further store additional information, such as a phone number associated with device 110. In examples where device 110 is a mobile phone, the phone number may be used to place a voice-over-IP call to device 110. Application server 140 stores the information in a manner that establishes that device 110, as identified by the hardware identifier, is a device associated with or "bound to" the user and/or the user's account. Device 110 may present user interface 102E.

In the example described, an email communication is used as part of a two-factor authentication procedure to bind device 110 to the user's account. In other examples, other methods may be used as part of a similar two-factor authentication procedure. For instance, application server 140 might send a text message with a code, or place a voice call to device 110 or another device associated with the authorized user on the account. Other procedures for implementing a two-factor authentication procedure are known or may be hereafter developed, and within the scope of this disclosure.

Application server 140 may, at a later date, again authenticate the user of device 110. For instance, with reference to the example of FIG. 1B, device 110 detects input that it determines is sufficient to enable access to device 110 (e.g., the user unlocks device 110 by interacting with user interface 102F). Device 110 then detects further input that it determines corresponds to a request to access services provided by XYZ Bank. Device 110 presents user interface 102G, requesting authentication credentials. Device 110 detects input and outputs a signal over network 105. Application server 140 detects a signal over network 105, and determines that the signal includes authentication credentials for a user. Application server 140 further determines that the signal includes information identifying the device (i.e., device 110) that sent the authentication credentials. Application server 140 accesses information in data store 145. Application server 140 determines, based on the accessed information, that the authentication credentials are a valid for a particular account. Application server 140 may further determine, based on the accessed information, that the information identifying the device that sent the authentication credentials matches a hardware identifier for a device that is associated with or bound to the same account. Application server 140 therefore concludes that the user of device 110 is authenticated, and is using a device that has previously been used with that user's account.

Device 110 may present one or more user interfaces in response to the user browsing information about XYZ Bank. For instance, in the example of FIG. 1B, device 110 detects further input and outputs further signals over network 105 to application server 140. In response, application server 140 outputs one or more signals over network 105 that device 110 determines includes information enabling device 110 to present various user interfaces. Device 110 may, for example, present user interface 102H, enabling the user of device 110 to select from and/or navigate to information about various banking services, such as "personal banking,"

"brokerage," "mortgage," and/or other services. In the example illustrated in FIG. 1, device 110 detects input, while user interface 102H is presented at display 111, that it determines corresponds to a request to navigate to "mortgage" services. In response, device 110 presents user interface 102J.

Application server 140 may determine that the user of device 110 has expressed an interest in communicating with an agent. For instance, in the example of FIG. 1B, device 110 detects input that it determines corresponds to the user's selection of button 103J of user interface 102J. Device 110 outputs a signal over network 105 that includes a request to establish communications with an agent of XYZ Bank. Application server 140 receives one or more signals over network 105. Application server 140 determines that the signals correspond to a request, from a device operated by the authenticated user, to engage in a voice call session with an agent. Application server 140 further determines that the signals include information identifying the device making the request, and that the requesting device (i.e., device 110) has been previously authorized to access the user's account (i.e., device 110 is bound to the user's account). Still further, application server 140 determines that the signals include information about the context of the request received from device 110. For instance, in the example illustrated, application server 140 determines that the user of device 110 was interacting with various mortgage services provided by XYZ Bank when the user requested to speak with an agent.

Application server 140 may initiate a call to device 110 so that the user may speak with an agent. For instance, in the example of FIG. 1B, application server 140 determines, based on information accessed in data store 145, a phone number associated with a bound device associated with the user. Application server 140 causes routing engine 150 to initiate a VOIP call to the phone number associated with the bound device. Routing engine 150 outputs over network 105, or causes application server 140 to output over network 105, a signal. Device 110 detects a signal that it determines corresponds to an incoming VOIP call. Device 110 receives the signal because it is the device associated with the phone number, and is the bound device associated with the user's account. Responsive to receiving the signal, device 110 verifies that it was the device that requested to engage in a voice call session with an agent. If verified, device 110 connects the call.

Before or after device 110 connects the call, routing engine 150 determines, based on the context of the request received from device 110, an appropriate routing destination for the call. In some examples, routing engine 150 may route the call to different agents of XYZ Bank (e.g., agent 174A or agent 174B) depending on the context of the call. In other examples, routing engine 150 may route the call to a system such as interactive voice response system 172 or to third party agent 176. In the example of FIG. 1B, since the user of device 110 was browsing information about mortgage services, routing engine 150 routes the call to agent 174A, who may be a mortgage agent. Once connected, the user operating device 110 may thereafter engage in a voice conversation with agent 174A over a VOIP connection. Device 110 presents user interface 102K, providing an indication to the user that a call is in progress. Device 110 may end the call in response to a selection of button 103K.

In the example just described, device 110 detects input corresponding to a user's selection of the "CALL" button 103J, but device 110 does not initiate the VOIP call to an agent at XYZ Bank. Instead, the VOIP call is initiated or placed by application server 140 (and/or routing engine 150) to device 110 at a phone number known to be associated with the authenticated account of the user. From the perspective of the user, however, it may appear that the device 110 has placed the call (i.e., to XYZ Bank), rather than received the call from application server 140 (i.e., XYZ Bank). Further, such an arrangement may reduce the cost to the user, since the user is not initiating the call, and therefore the cost of any data or minutes accrued during the call might not be passed on to the user.

By initiating the call to device 110 in this way, application server 140 may further ensure that application server 140 and routing engine 150 are communicating with device 110, and not some other device that is imitating device 110. For example, an attempt might be made, by a person or system seeking to fraudulently gain access to an account at XYZ Bank, to initiate a voice conversation with an agent of XYZ Bank. In such an example, a device used to perpetrate the fraud, such as device 110X in FIG. 1B, may be used as part of a scheme to persuade a call center agent to unwittingly assist in the fraud. In such an example, device 110X may send a signal over network 105 to application server 140, seeking to initiate a voice conversation with an agent. Device 110X may have previously gained improper access to some information about a user account. Therefore, device 110X may be capable of configuring a signal that imitates a valid signal that might be validly sent by device 110 requesting to establish communications with an agent for the account. Application server 140 may, in response to the imitation signal sent by device 110X, cause routing engine 150 to initiate a call to the phone number associated with that particular account. The phone number associated with the account causes calls to route to device 110, however, and not device 110X. Therefore, device 110 may detect, over network 105, a signal that it determines corresponds to an incoming VOIP call. In this example, device 110 would determine that it had not recently requested to establish communications with an agent though a VOIP call (the request was sent by device 110X, and not device 110). Device 110 therefore refuses to connect the call, and because the call was placed to device 110, and not device 110X, device 110X is prevented from establishing a call with an agent for XYZ Bank. Accordingly, an effort to fraudulently initiate communications using device 110X (or another device that is not device 110) is likely to fail, and therefore the procedure described provides a measure of security preventing fraudulent calls to, for example, agent 174A. Yet the additional security provided by the procedure might not affect the user experience for valid users in any way since, for valid requests to speak to an agent, it appears to the user that device 110 initiates a call to XYZ Bank in response to selection of button 103J.

In the example of FIG. 1B, system 100 is described as establishing a call between a user of device 110 and one or more agents 174 of XYZ Bank. In other examples, however, a call may be established directly between device 110 and a third party. For example, application server 140 may, in response to input received from device 110, initiate a call in the manner described. However, application server 140 may cause routing engine 150 to route the call to third party agent 176, rather than one of agents 174. The level of authentication and security provided by the described techniques may enable routing engine 150 to route a call to a third party and vouch for the authenticity of the call. In such an example, a third party may rely on authentication assurances made by routing engine 150 (on behalf of XYZ Bank) for calls originating from routing engine 150, and may avoid some or all further authentication steps. Similarly, application server 140 may cause routing engine 150 to route calls to interactive voice response system 172, or to another system that may be operated by a third party.

FIG. 1A and FIG. 1B illustrate at least one example implementation of system 100. Although examples are described herein in terms of call centers for a financial institution or bank, techniques described herein may apply to other types of communications, and may apply to other types of business or organizations, and the scope of this disclosure is not limited to the described examples. Accordingly, other example or alternative implementations of system 100 may be appropriate in other instances. Such implementations may include a subset of the devices and/or components included in the example(s) of FIG. 1A and FIG. 1B and/or may include additional devices and/or components not shown in FIG. 1A and FIG. 1B.

Accordingly, although one or more implementations of system 100 have been described with reference to FIG. 1A and FIG. 1B, system 100 may be implemented in a number of different ways. For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1A and/or FIG. 1B may alternatively be implemented as part of another device or component not shown in FIG. 1A and/or FIG. 1B.

Further, certain operations, techniques, features, and/or functions may have been described herein as being performed by specific components, devices, and/or modules in FIG. 1A and/or FIG. 1B. In other examples, such operations, techniques, features, and/or functions may be performed by different components, devices, or modules. Accordingly, some operations, techniques, features, and/or functions that may have been described herein as being attributed to one or more components, devices, or modules in FIG. 1A and/or FIG. 1B may, in other examples, be attributed to other components, devices, and/or modules, even if not specifically described herein in such a manner.

Through techniques in accordance with one or more aspects of the present disclosure, such as by authenticating customers or other people that seek to engage in a voice conversation with a call center agent, system 100 may prevent or mitigate fraud. By preventing or mitigating fraud, system 100 may limit loss of data, prevent financial loss, and more securely protect financial assets, at least because unauthorized users will be less likely to fraudulently gain access to data or gain control of financial accounts. Therefore, aspects of this disclosure may improve the function of system 100 because performing authentication effectively for call center voice sessions may have the effect of causing system 100 to be more secure.

Figure 2:
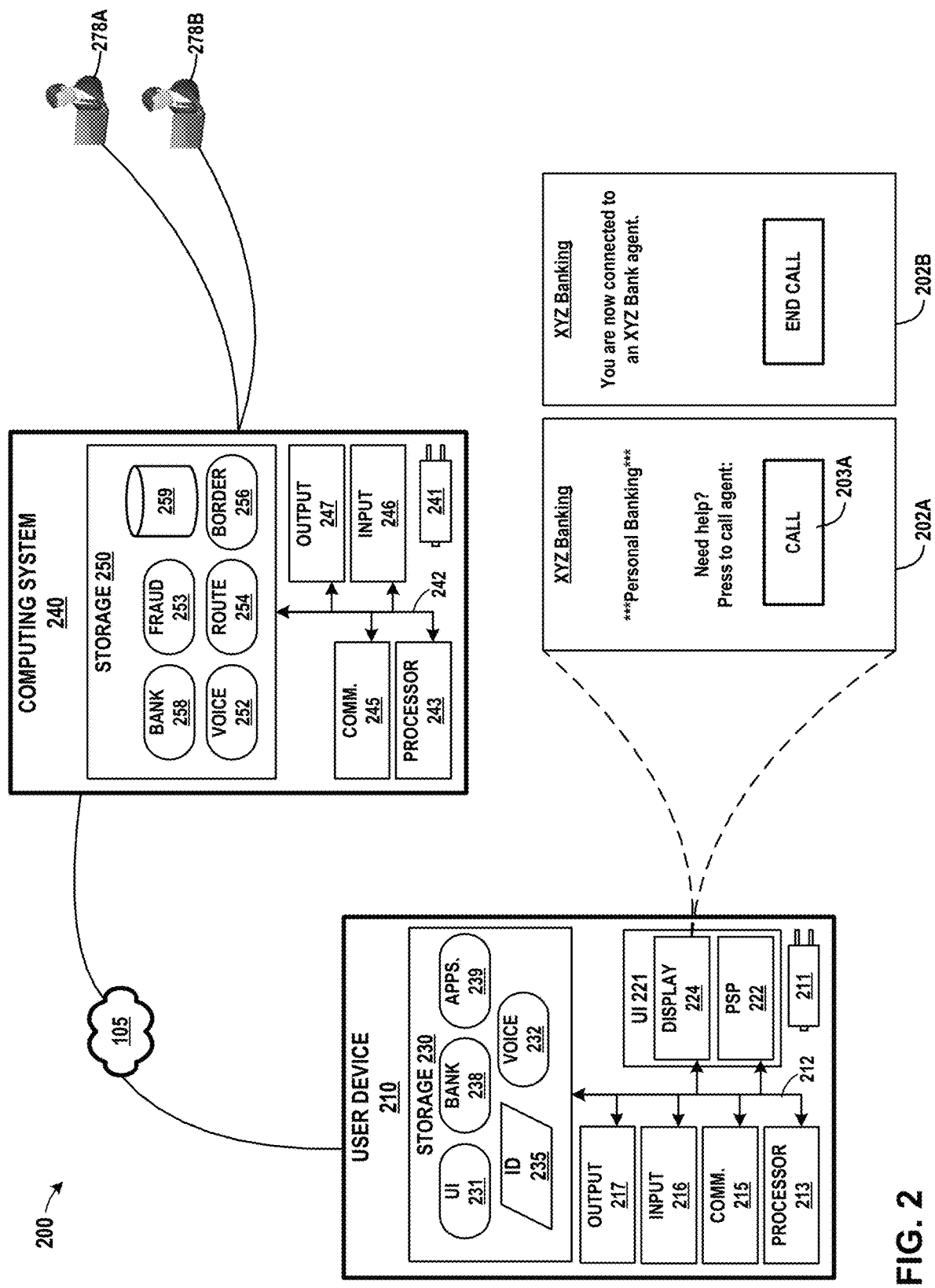
FIG. 2 is a block diagram illustrating an example system for establishing a voice call session between a device and a call center, in accordance with one or more aspects of the present disclosure.

FIG. 2 is a block diagram illustrating an example system for establishing a voice call session between a device and a call center, in accordance with one or more aspects of the present disclosure. System 200 of FIG. 2 may be described as an example or alternative implementation of system 100 of FIGS. 1A and 1B. One or more aspects of FIG. 2 may be described herein within the context of FIGS. 1A and 1B. In the example of FIG. 2, system 200 includes device 210 in communication with computing system 240 over network 105. Computing system 240 may connect a user of device 210 with one or more of agents 278. In FIG. 2, computing system 240 may generally correspond to a system that combines, includes, and/or implements aspects of the functionality of application server 140 and routing engine 150 of FIG. 1A and FIG. 1B. For ease of illustration, one device 210 and one computing system 240 are illustrated in FIG. 2, although techniques in accordance with one or more aspects of the present disclosure may be performed with many more of such systems.

Network 105 of FIG. 2 (and also shown in FIGS. 1A and 1B) may be the internet, or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 2 or otherwise on network 105 may be in a remote location relative to one or more other illustrated devices or systems.

Computing system 240 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 240 represents a cloud computing system, server farm, and/or server cluster (or portion thereof) that provides services to client devices and other devices or systems. In other examples, computing system 240 may represent or be implemented through one or more virtualized compute instances (e.g., virtual machines, containers) of a data center, cloud computing system, server farm, and/or server cluster.

In the example of FIG. 2, computing system 240 may include power source 241, one or more processors 243, one or more communication units 245, one or more input devices 246, one or more output devices 247, and one or more storage devices 250. Storage devices 250 may include voice module 252, fraud monitoring module 253, call routing module 254, session border control module 256, and banking module 258. One or more of the devices, modules, storage areas, or other components of computing system 240 may be interconnected to enable inter-component communications (physically, communicatively, and/or operatively). In some examples, such connectivity may be provided by through communication channels (e.g., communication channels 242), a system bus, a network connection, an inter-process communication data structure, or any other method for communicating data.

Power source 241 may provide power to one or more components of computing system 240. Power source 241 may receive power from the primary alternating current (AC) power supply in a building, home, or other location. In other examples, power source 241 may be a battery or a device that supplies direct current (DC). In still further examples, computing system 240 and/or power source 241 may receive power from another source. One or more of the devices or components illustrated within computing system 240 may be connected to power source 241, and/or may receive power from power source 241. Power source 241 may have intelligent power management or consumption capabilities, and such features may be controlled, accessed, or adjusted by one or more modules of computing system 240 and/or by one or more processors 243 to intelligently consume, allocate, supply, or otherwise manage power.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Central monitoring system 210 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with other devices over a network. In some examples, communication units 245 may include communications hardware adapted for or suited for use by a server on a network. Communication units 245 may be implemented in a manner similar to or consistent with the description of other communication units described herein.

One or more input devices 246 may represent any input devices of computing system 240 not otherwise separately described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of computing system 240 not otherwise separately described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator). Some devices may serve as both input and output devices.

For example, a communication device may both send and receive data to and from other systems or devices over a network.

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

In some examples, one or more storage devices 250 are temporary memories, meaning that a primary purpose of the one or more storage devices is not long-term storage. Storage devices 250 of computing system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Banking module 258 may perform functions relating to interacting with one or more devices 210, providing banking, financial, or other information to users of devices 210, and authenticating users of device 210. Banking module 258 may perform financial services in response to requests that banking module 258 of computing system 240 receives from one or more client computers (e.g., as part of a task that one or more client devices are performing on behalf of a user of a client device). Banking module 258 may access information within data store 259 in order to authenticate a user or to perform services on behalf of a user. Banking module 258 may interact with data store 259 and other devices to bind one or more devices 210 to user accounts. Banking module 258 may interact with computing system 240 and/or cause call routing module 254 to cause computing system 240 to route a call to one or more agents 278 or to other systems. Banking module 258 may receive information from and output information to one or more other modules, and may otherwise interact with and/or operate in conjunction with one or more other modules of computing system 240.

Voice module 252 may perform functions relating to initiating voice calls, including VOIP calls, to one or more devices 210. Voice module 252 may implement WebRTC protocols and/or APIs, and thereby enable real-time communication over peer-to-peer connections. Voice module 252 may receive information from and output information to one or more other modules, and may otherwise interact with and/or operate in conjunction with one or more other modules of computing system 240. For example, voice module 252 may receive input that it interprets as a request, from a user of a device 210, to transfer a call, to terminate a call, to convert a call to a traditional voice call, or to otherwise reconfigure an ongoing call. Voice module 252 may interact with call routing module 254 to transfer or route a call initiated by voice module 252 to an appropriate destination. Voice module 252 may interact with session border control module 256 to convert VOIP or data calls to traditional voice calls.

Fraud monitoring module 253 may perform functions relating to analyzing ongoing or previous calls for indicators of fraud, for information about attempted fraud, or new or potentially new fraud practices. Fraud monitoring module 253 may analyze requests to speak with an agent in the context in which the requests were made. Fraud monitoring module 253 may, based on this analysis, identify indicators of fraudulent activity and/or log information about for later analysis. Fraud monitoring module 253 may further monitor behaviors of a user, and may monitor any voice conversations that result from requests initiated by devices used by that user. Fraud monitoring module 253 may embody or apply any tools or algorithms that an organization (e.g., XYZ Bank) has developed to mitigate potential fraud or to otherwise act on ongoing or potential fraud.

Call routing module 254 may perform functions relating to initiating and/or routing calls on behalf of banking module 258. Call routing module 254 may, based on contextual information received from banking module 258, determine an appropriate destination to route a call. Call routing module 254 may exercise control over a call while the call is in progress, and may terminate a call in response to input or in response to other conditions. Call routing module 254 may, when routing a call from a first agent to a second agent, store information about the first agent. Thereafter, call routing module 254 may route the call back to the first agent. Call routing module 254 may receive information from and output information to one or more other modules, and may otherwise interact with and/or operate in conjunction with one or more other modules of computing system 240. Call routing module 254 may implement functions performed by call routing solutions available through Genesys Telecommunications Laboratories. Functions performed by call routing module 254 could be performed by a separate hardware device or one implemented primarily or partially through hardware.

Session border control module 256 may perform functions relating to managing phone calls that are routed outside an organization. In some examples, session border control module 256 may convert a VOIP session established by voice module 252 or call routing module 254 and bridge in a traditional voice call to a third party, such as agent 278A or third party agent 176 (see FIG. 1B). In such an example, session border control module 256 may continue to monitor the ongoing call, and may convert the call back to a data-based VOIP call after the conversation with the third party is completed. Functions performed by session border control module 256 could be performed by a separate hardware device or one implemented primarily or partially through hardware.

Data store 259 may represent any suitable data structure or storage medium for storing information related to storing information about user accounts, including authentication credentials and related information, and information about devices and phone numbers associated with each of the user accounts. Data store 259 may store information identifying bound devices and phone numbers associated with those bound devices. Data store 259 may store information that may be used to implement a two-factor authentication procedure (e.g., email addresses, alternative phone numbers, Snapchat addresses). The information stored in data store 259 may be searchable and/or categorized such that one or more modules within computing system 240 may provide an input requesting information from data store 259, and in response to the input, receive information stored within data store 259. Data store 259 may be primarily maintained by banking module 258. Data store 259 may provide other modules with access to the data stored within data store 259, and/or may analyze the data stored within data store 259 and output such information on behalf of other modules of computing system 240.

Device 210 may be implemented as any suitable computing system, such as a mobile, non-mobile, wearable, and/or non-wearable computing device. Device 210 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

In the example of FIG. 2, device 210 may include power source 211, one or more processors 213, one or more communication units 215, one or more input devices 216, one or more output devices 217, one or more user interface devices 221, and one or more storage devices 230. User interface device 221 includes presence-sensitive panel 222 ("PSP") and display 224. Storage device 230 includes user interface module 231, banking module 238, voice module 232, hardware identifier 235, and applications 239. One or more of the devices, modules, storage areas, or other components of device 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of device 210, and may be implemented in a manner similar to or consistent with other sources of power described herein.

One or more processors 213 of device 210 may implement functionality and/or execute instructions associated with device 210 or associated with one or more modules illustrated herein and/or described below and may be implemented in a manner similar to or consistent with the description of other processors or processing circuitry described herein.

One or more communication units 215 of device 210 may communicate with devices external to device 210 by transmitting and/or receiving data over a network or otherwise, and may be implemented in a manner similar to or consistent with the description of other communication units described herein. In some examples, communication units 215 may include communications hardware adapted for or suited for use in a mobile device or mobile phone. For instance, communication units 215 may send and/or receive radio signals on a radio network such as a cellular radio network. In other examples, communication units 215 of device 210 may transmit and/or receive satellite signals on a satellite network such as a Global Positioning System (GPS) network. Examples of communication units 215 include a network interface card (e.g. such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

User interface device 221 may function as an input and/or output device or set of input/output devices for device 210, and may be implemented using various devices, components, and/or technologies. User interface device 221 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 221 may include display devices, speaker technologies, haptic feedback technologies, tactile feedback technologies, light emitting technologies, or other output device technologies for use in outputting information to a user.

In the example of FIG. 2, user interface device 221 includes one or more displays 224 and one or more presence-sensitive panels 222. Although certain components associated with device 210 are described or illustrated in FIG. 2 as being implemented within user interface device 221, in other examples, such components could be implemented external to user interface device 221, and other components could be implemented within user interface device 221. Further, while illustrated as an internal component of device 210, user interface device 221 may also represent an external or partially external component that shares a data path with device 210 for transmitting and/or receiving input and output. For instance, in some examples, user interface device 221 represents a built-in component of device 210 located within and physically connected to the external packaging of device 210 (e.g., a screen on a mobile phone). In other examples, user interface device 221 represents an external component of device 210 located outside and physically separated from the packaging or housing of device 210 (e.g., a monitor, a projector, etc. that shares a wired and/or wireless data path with device 210). In still other examples, one or more components of user interface device 221 may be built-in components of device 210, and one or more components of user interface device 221 may be external components of device 210 (e.g., some components of user interface device 221 may be internal, and others may be external). Further, one or more components of user interface device 221 may be integrated together, so that one component is or appears to be a built-in component of another (e.g., a display device and a presence-sensitive panel may be used together to implement a touch-screen display). For instance, display 224 may integrated with presence-sensitive panel 222, so that user interface device 221 includes or operates as a touch-sensitive or presence-sensitive display screen. In such an implementation, user interface device 221 may receive indications of tactile input by detecting one or more gestures from a user (e.g., the user touching or pointing to one or more locations of display 224 with a finger or a stylus pen). User interface device 221 may present output to a user as a graphical user interface at display 224. For example, user interface device 221 may present various user interfaces related to functions provided by one or more modules of device 210 or another feature of a computing platform, operating system, application, and/or service executing at or accessible from device 210 (e.g., an electronic message application, Internet browser application, a mobile or desktop operating system, etc.).

One or more presence-sensitive panels 222 may serve as an input device, and may detect an object, such as a finger or stylus, and determine a location (e.g., an x and y coordinate) of the object relative to a panel. Presence-sensitive panel 222 may be implemented using a resistive touchscreen or panel, a surface acoustic wave touchscreen or panel, a capacitive touchscreen or panel, a projective capacitance touchscreen or panel, a pressure-sensitive panel, an acoustic pulse recognition touchscreen or panel, or any other presence-sensitive panel (PSP) technology now known or hereafter conceived. In some examples, presence-sensitive panel 222 may provide output to a user using tactile, haptic, audio, visual, or video stimuli. For example, presence-sensitive panel 222 may be integrated into a display component (e.g., display 224), so that presence-sensitive panel 222 serves as a touch-sensitive display screen. In such an example, presence-sensitive panel 222 may determine the location of that portion of the surface of display 224 selected by a stylus or a user's finger using capacitive, inductive, and/or optical recognition techniques. Based on such input, presence-sensitive panel 222 may output or update a graphical user interface presented at display 224.

One or more displays 224 may generally refer to any appropriate type of display device, such as a display associated with any type of computing device, such as a tablet, mobile phone, watch, or any other type of wearable, non-wearable, mobile, or non-mobile computing device. Display 224 may function as one or more output (e.g., display) devices using technologies including liquid crystal displays (LCD), dot matrix displays, light emitting diode (LED) displays, organic light-emitting diode (OLED) displays, cathode ray tube (CRT), e-ink, or similar monochrome or color displays capable of generating tactile, audio, and/or visual output to a human or machine. Display 224 may output information to a user in the form of a user interface, which may be associated with functionality provided by device 210. Such user interfaces may be associated with computing platforms, operating systems, applications, and/or services executing at or accessible from device 210 (e.g., banking applications, electronic message applications, chat applications, Internet browser applications, mobile or desktop operating systems, social media applications, electronic games, and other types of applications). For example, display 224 may present one or more user interfaces which are graphical user interfaces of an application executing at device 210 including various graphical elements displayed at various locations of display 224.

One or more input devices 216 may represent any input devices of device 210 not otherwise separately described herein. One or more input devices 216 may generate, receive, and/or process input from any type of device capable of detecting input from a human or machine. For example, one or more input devices 216 may generate, receive, and/or process input in the form of electrical, physical, audio, image, and/or visual input (e.g., peripheral device, keyboard, microphone, camera).

One or more output devices 217 may represent any output devices of device 210 not otherwise separately described herein. One or more output devices 217 may generate, receive, and/or process input from any type of device capable of detecting input from a human or machine. For example, one or more output devices 217 may generate, receive, and/or process output in the form of electrical and/or physical output (e.g., peripheral device, actuator). One or more output devices 217 may generate, present, and/or process output in the form of tactile, audio, visual, video, and other output. Output devices 217 may include a sound card, video graphics adapter card, speaker, presence-sensitive screen, one or more USB interfaces, video and/or audio output interfaces, a display, or any other type of device capable of generating tactile, audio, visual, video, or other output (e.g., a haptic response, a sound, a flash of light, and/or images). Some devices may serve as both input and output devices. For example, a communication device may both send and receive data to and from other systems or devices over a network.

One or more storage devices 230 within device 210 may store program instructions and/or data associated with one or more of the modules of storage devices 230 in accordance with one or more aspects of this disclosure. One or more processors 213 and one or more storage devices 230 may provide an operating environment or platform for such modules. Storage devices 230 may be implemented in a manner similar to or consistent with the description of other storage devices described herein.

User interface module 231 may manage user interactions with user interface device 221 and other components of device 210. User interface module 231 may cause user interface device 221 to output various user interfaces for display or presentation or otherwise, as a user of device 210 views, hears, or otherwise senses output and/or provides input at user interface device 221. User interface device 221 may detect input, and may output to user interface module 231 one or more indications of input as a user of device 210 interacts with a user interface presented at user interface device 221. User interface module 231 and user interface device 221 may interpret inputs detected at user interface device 221 and may relay information about the inputs detected at user interface device 221 to one or more associated platforms, operating systems, applications, and/or services executing at device 210 to cause device 210 to perform one or more functions. User interface module 231 may receive information and instructions from a platform, operating system, application, and/or service executing at device 210 and/or one or more remote computing systems. In addition, user interface module 231 may act as an intermediary between a platform, operating system, application, and/or service executing at device 210 and various output devices of device 210 (e.g., speakers, LED indicators, audio or electrostatic haptic output devices, light emitting technologies, displays, etc.) to produce output (e.g., a graphic, a flash of light, a sound, a haptic response, etc.).

Banking module 238 may perform functions relating to presenting user interfaces enabling a user of device 210 to interact with a bank or other financial institution. In some examples, banking module 238 may provide information about account balances, recent payments, upcoming payments, or other information. Banking module 238 may enable various banking functions or operations, such as funds transfers, bill payment, and other activities. Banking module 238 may enable a user of device 210 to initiate a voice conversation with an agent of his or her bank or financial institution. Banking module 238 may receive information from and output information to one or more other modules, and may otherwise interact with and/or operate in conjunction with one or more other modules of device 210. In some examples, banking module 238 may represent an application developed, administered, or otherwise controlled by a bank with which a user of device 210 has a relationship. Although banking module 238 may be described in connection with FIG. 2 as primarily performing banking operations and related authentication procedures, banking module 238 may alternatively, or in addition, perform other operations unrelated to banking.

Voice module 232 may perform functions relating to connecting incoming voice calls from computing system 240 or elsewhere. Voice module 232 may, in some examples, analyze a signal to determine whether it corresponds to a call requested by device 210. Voice module 232 may, in appropriate circumstances, connect an incoming voice call and enable a user of device 210 to engage in a voice conversation. In other examples, voice module 232 may refuse to connect an incoming voice call where the call has not been sufficiently authenticated. In some examples, voice module 232 may initiate a traditional or VOIP phone call to computing system 240 or to another device. Voice module 232 may implement WebRTC protocols and/or APIs, and thereby enable real-time communication over peer-to-peer connections pursuant to such protocols.

Hardware identifier 235 may include information derived from device 210 or read from read-only memory of device 210. Device 210 may use hardware identifier 235 to identify itself to another device on network 105, such as computing system 240. In some examples, hardware identifier 235 may be a media access control address (i.e., MAC address) associated with a network interface circuitry included within device 110, or a hardware identifier derived from the MAC address. In other examples, hardware identifier 235 may be derived from other hardware within device 210. Although described as a "hardware" identifier, hardware identifier 235 may, in some examples, be modifiable, configured by a user, or otherwise adjustable.

One or more applications 239 may represent some or all of the other various individual applications and/or services executing at and accessible from computing device 210. A user of computing device 210 may interact with a user interface (e.g., visual, graphical, or voice-prompt user interface) associated with one or more applications 239 to cause computing device 210 to perform a function. Numerous examples of applications 239 may exist and may include financial record-keeping applications, financial services applications, web browsing, search, communication, and shopping applications, and any and all other applications that may execute at computing device 210.

In the example of FIG. 2, and in accordance with one or more aspects of the present disclosure, device 210 may authenticate a user. For instance, in the example of FIG. 2, presence-sensitive panel 222 of device 210 detects input and outputs to user interface module 231 an indication of input. User interface module 231 determines that the input corresponds to a request to perform banking services, or initiate, instantiate, or start a banking application. In the example of FIG. 2, user interface module 231 causes banking module 238 to execute. Banking module 238 may, for example, be banking application on a mobile phone. Banking module 238 causes user interface module 231 to present a user interface, such as user interface 102B, at display 224. Presence-sensitive panel 222 detects input and outputs to user interface module 231 an indication of input. User interface module 231 outputs to banking module 238 information about the input. Banking module 238 determines that the input corresponds to authentication credentials. Banking module 238 causes communication unit 215 to output a signal over network 105. Communication unit 245 of computing system 240 detects input and outputs to banking module 258 an indication of input. Banking module 258 determines that the input includes authentication credentials for a user of device 110. Banking module 258 accesses data store 259 and determines that the authentication credentials authenticate the user. Banking module 258 causes communication unit 245 to output a signal over network 105.

Communication unit 215 of device 210 detects a signal and outputs an indication of the signal to banking module 238. Banking module 238 determines that the signal includes information sufficient to present user interface 102C of FIG. 1A. Banking module 258 causes display 224 to present user interface 102C, informing the user that he or she has been authenticated and inviting the user to bind device 210 to his or her account.

Computing system 240 may bind device 210 to the authenticated account. For instance, in the example of FIG. 2, presence-sensitive panel 222 detects input and outputs to user interface module 231 an indication of input. User interface module 231 outputs to banking module 238 information about the input. Banking module 238 causes communication unit 215 to output a signal over network 105. Communication unit 245 of computing system 240 detects a signal and outputs to banking module 258 information about the signal. Banking module 258 determines that the signal corresponds to a request to bind device 210 to the user's account. Banking module 258 accesses data store 259 and identifies an alternative method of contacting the user of device 210. For example, banking module 258 may identify an email address associated with the user's account. Banking module 258 sends a code to the user through that alternative method of contacting the user of device 210. Banking module 258 may cause communication unit 245 to send an email to the identified email address.

Banking module 258 also causes communication unit 245 to output a signal over network 105. Communication unit 215 of device 210 detects a signal and outputs to banking module 238 an indication of the signal. Banking module 238 determines that the signal includes information sufficient to present a user interface, such as user interface 102D. Banking module 238 causes display 224 to present user interface 102D of FIG. 1A, inviting the user to input a code sent to the user. Presence-sensitive panel 222 detects input that banking module 238 determines corresponds to a code entered by the user. Banking module 238 outputs a signal over network 105 that includes the code and hardware identifier 235 or information derived from hardware identifier 235. In some examples, hardware identifier 235 may have been sent earlier to computing system 240 by device 210. Communication unit 245 detects a signal and outputs to banking module 258 an indication of the signal. Banking module 258 determines that the signal includes a code matching the code sent to the user. Banking module 258 further determines that the signal includes information identifying device 210. Banking module 258 stores in data store 259 information establishing that device 210, identifiable by hardware identifier 235, is a device known to be used by the authenticated user associated with the accessed account.

Computing system 240 may determine that device 210 seeks to speak with an agent. For instance, in the example of FIG. 2, presence-sensitive panel 222 detects input that it determines corresponds to interactions with user interfaces presented by banking module 238. In one example, presence-sensitive panel 222 detects input that banking module 238 determines corresponds to a request to access "personal banking" services provided by XYZ Bank. In the example of FIG. 2, banking module 238 causes user interface module 231 to present user interface 202A at display 224. Thereafter, presence-sensitive panel 222 detects input that banking module 238 determines corresponds to a request to talk to an agent (e.g., through selection of button 203A). Banking module 238 causes communication unit 215 to output a signal over network 105 that includes a request to establish communications with an agent of XYZ Bank. Communication unit 245 of computing system 240 detects a signal that banking module 258 determines corresponds to a request, by a user of device 210, to establish a voice call session with an agent of XYZ Bank. Banking module 258 further determines that the signal originated from an application operated by an authenticated user of device 210, and that the request was made while banking module 238 executing at device 210 was presenting information about personal banking services.

Computing system 240 may initiate a call to device 210. For instance, in the example of FIG. 2, banking module 258 of computing system 240 accesses information in data store 259 and identifies a phone number associated with the authenticated user and device 210. Banking module 258 outputs information to voice module 252. Voice module 252 uses the information to cause a signal to be sent over network 105, corresponding to a VOIP call being initiated to the identified phone number. Communication unit 215 of device 210 detects a signal that it determines corresponds to an incoming VOIP call. Communication unit 215 outputs to banking module 238 information about the incoming call. Banking module 238 verifies that device 210 actually requested the call (and that the call was not initiated by another unauthorized device). In some examples, banking module 238 may determine that the signal includes a code that identifies the device that requested the call. In such an example, banking module 238 may verify that device 210 requested the call by determining whether the code matches hardware identifier 235. If verified, banking module 238 outputs to voice module 232 information about the signal. Voice module 232 connects the call, enabling a user of device 210 to engage in a conversation, over the VOIP connection, with an agent. Banking module 238 may cause user interface module 231 to present user interface 202B at display 224, informing the user that a call is in progress. If not verified, banking module 238 may cause voice module 232 to refuse the call, thereby averting a potential fraud attempt.

Before or after initiating the call to device 210, computing system 240 may determine an appropriate destination for routing a call. For instance, in the example of FIG. 2, banking module 258 outputs to call routing module 254 information about the request to establish a voice call session. Call routing module 254 determines, based on the context of the request to talk to the agent, a destination to route the call. Call routing module 254 routes the call, or prepares to route the call, to the destination. In the example of FIG. 2, since the context of the call was personal banking, call routing module 254 may route the call to a personal banker agent (e.g., agent 278A) associated with XYZ Bank.

During and/or after the call, computing system 240 may monitor for fraud. For instance, in the example of FIG. 2, banking module 258 may output information about the call to fraud monitoring module 253. Fraud monitoring module 253 may analyze the original request to talk to an agent, the context of the call, the account associated with the request, other information about the activities of device 210, and information about previously logged activity associated with the account associated with the request or with the activities of device 210. Fraud monitoring module 253 may, based on this analysis, identify indicators of fraudulent activity. Fraud monitoring module 253 may log information about the call for later analysis. Fraud monitoring module 253 may further monitor behaviors of the user of device 210, and may monitor any voice conversations that result from the request. Fraud monitoring module 253 may apply any tools or algorithms that XYZ Bank may have developed to mitigate potential fraud, and act on the call accordingly. Such actions may include interrupting the call, communicating with an agent during a call, transferring a call to a fraud agent, or other actions.

During the course of the call, computing system 240 may transfer a call to another agent. For instance, in the example of FIG. 2, communication unit 245 detects input that voice module 252 determines corresponds to a request, by agent 278A, to transfer the call to a different line of business within XYZ Bank. In one example, agent 278A may determine, based on his or her conversation with the user of device 210, that the call should be handled by an agent for the brokerage line of business within XYZ Banking. In such an example, computing system 240 may detect input from agent 278A, and in response to such input, perform the call transfer. In such an example, voice module 252 may cause call routing module 254 to route the call to agent 278B, who may be an agent dedicated to the brokerage line of business.

In some examples, banking module 258 may determine that additional security authentication may be required of the user of device 210. For instance, if a call is transferred to the brokerage line of business, XYZ Bank may require a higher authentication levels for the brokerage line of business, as compared to the personal banking line of business within XYZ Bank. Accordingly, banking module 258 may cause communication unit 245 to output signals over network 105 that device 210 determines corresponds to request for additional authentication tokens. Device 210 may, upon detecting responsive input, send a signal over network 105 that banking module 258 determines corresponds to the requested additional authentication tokens. Banking module 258 may determine, based on the additional tokens, whether the user is authenticated to interact with agent 278B. If so, the call continues, and agent 174C assists the user of device 210 with brokerage services. If not, voice module 252 may inform agent 278B that communications relating to the brokerage line of business are not authorized for the user of device 210. In some examples, call routing module 254 may end the call. In other examples, call routing module 254 may route the call back to back to agent 278A.

In some examples, communication unit 245 may detect input that voice module 252 determines corresponds to a request, by agent 278A, to transfer the call to a third party using a conventional voice call, rather than a VOIP call. For instance, agent 278A may determine, based on his or her conversation with the user of device 210, that the user of device 210 is seeking to order new checks for a checking account held at XYZ Bank. In such an example, computing system 240 may detect input from agent 278A, and in response to such input, computing system 240 may initiate a call to a third party check printer. Voice module 252 causes session border control module 256 to convert the VOIP session established between agent 278A and device 210 and bridge in a traditional voice call to a third party agent (not shown). Agent 278A may continue to remain on the line, and session border control module 256 may convert the call back to a data-based VOIP call after the interaction with the third party agent is complete. In other examples, agent 278A may be dropped from the call session while the interaction with the third party agent takes place.

Modules illustrated in FIG. 2 (e.g., user interface module 231, voice module 232, banking module 238, applications 239, voice module 252, fraud monitoring module 253, call routing module 254, session border control module 256, and banking module 258) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternative implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 of FIG. 2 are described, system 200 may be implemented in a number of other ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions are described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3:
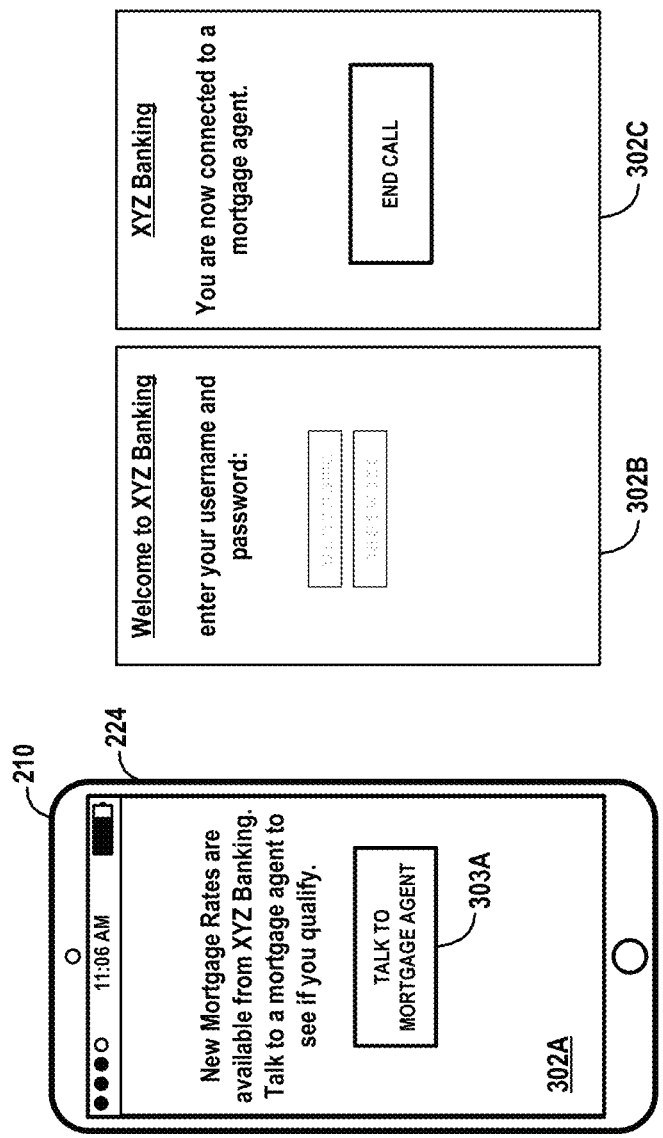
FIG. 3 is a conceptual diagram illustrating an example device used for establishing a secure voice call session in response to an unauthenticated user of the device making a request to speak with an agent, in accordance with one or more aspects of the present disclosure.

FIG. 3 is a conceptual diagram illustrating an example device used for establishing a secure voice call session in response to an unauthenticated user of the device making a request to speak with an agent, in accordance with one or more aspects of the present disclosure. FIG. 3 illustrates device 210 having display 224. Device 210 and display 224 may correspond to device 210 and display 224 of FIG. 2, respectively.

FIG. 3 illustrates example user interfaces (user interface 302A, user interface 302B, user interface 302C) presented by device 210. Although the user interfaces illustrated in FIG. 3 are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 3 may be described herein within the context of system 200 of FIG. 2.

In the example of FIG. 3, and in accordance with one or more aspects of the present disclosure, device 210 may present a web page to an unauthenticated user of device 210. For instance, in the example of FIG. 3, presence-sensitive panel 222 of device 210 detects input that user interface module 231 of FIG. 2 determines corresponds to a request to browse to a web page published by XYZ Bank. Communication unit 215 outputs a signal over network 105. Communication unit 245 of computing system 240 detects a signal and outputs to banking module 258 an indication of a signal. Banking module 258 determines that the signal includes a request, from an unauthenticated user, for a specific web page. Banking module 258 causes communication unit 245 to output a signal over network 105. Communication unit 215 detects a signal over network 105 and outputs an indication of the signal to user interface module 231. User interface module 231 determines that the signal includes information sufficient to present user interface 302A. User interface module 231 presents user interface 302A at display 224.

Computing system 240 may determine that the unauthenticated user seeks to speak to an agent. For instance, in the example of FIG. 3, presence-sensitive panel 222 detects input that user interface module 231 determines corresponds to selection of button 303A. User interface module 231 causes communication unit 215 to output a signal over network 105. Communication unit 245 detects a signal and outputs to banking module 258 information about the signal. Banking module 258 determines that the signal corresponds to a request, by an authenticated user of device 210, to talk to a mortgage agent.

Computing system 240 may authenticate the user of device 210. For instance, in the example of FIG. 3, banking module 258 outputs a signal over network 105. Communication unit 215 detects a signal over network 105, and outputs an indication of the signal to user interface module 231. User interface module 231 determines that the signal corresponds to a request for banking module 238 to perform an authentication function. User interface module 231 outputs information about the signal to banking module 238. Banking module 238 causes user interface module 231 to present user interface 302B at presence-sensitive panel 222, requesting authentication credentials. Presence-sensitive panel 222 detects input that banking module 238 determines corresponds to an interaction with user interface 302B. Banking module 238 causes communication unit 215 to output a signal over network 105. Communication unit 245 of computing system 240 detects a signal that banking module 258 determines includes credentials authenticating the user of device 210 as an authorized user of an account at XYZ Bank. Banking module 258 may further determine that the signal includes information identifying device 210 as a device known to be used by the user's account.

Computing system 240 may initiate a call to device 210. Banking module 258 outputs to call routing module 254 information about the user's request to talk to a mortgage agent. Call routing module 254 initiates a call to device 210 and routes the call, or prepares to route the call, to a mortgage agent. For instance, in the example of FIG. 3, banking module 258 accesses information in data store 259 and identifies a phone number associated with the authenticated user and device 210. Banking module 258 outputs information to voice module 252. Voice module 252 uses the information to cause a signal to be sent over network 105, corresponding to a VOIP call being initiated to the identified phone number. Communication unit 215 of device 210 detects a signal that it determines corresponds to an incoming VOIP call. Communication unit 215 outputs to banking module 238 information about the incoming call. Banking module 238 verifies that device 210 actually requested the call (and that the call was not initiated by another unauthorized device). Banking module 238 may determine that the signal includes a code corresponding to a hardware identifier that matches hardware identifier 235. Voice module 232 connects the call, enabling a user of device 210 to engage in a conversation, over the VOIP connection, with an agent associated with XYZ Bank. Call routing module 254 routes the call to an appropriate agent, which in this example, may be a mortgage agent. Banking module 238 may cause user interface module 231 to present user interface 302C at display 224, informing the user that a call is in progress.

Although in the example described in connection with FIG. 3, the user is asked to authenticate in user interface 302B, in other examples, the user might not be required to authenticate. In such an example, banking module 258 may determine the identity of the user of device 210 and/or some level of authentication based on an identifying code included in one or more signals received from device 210.

Figure 4:
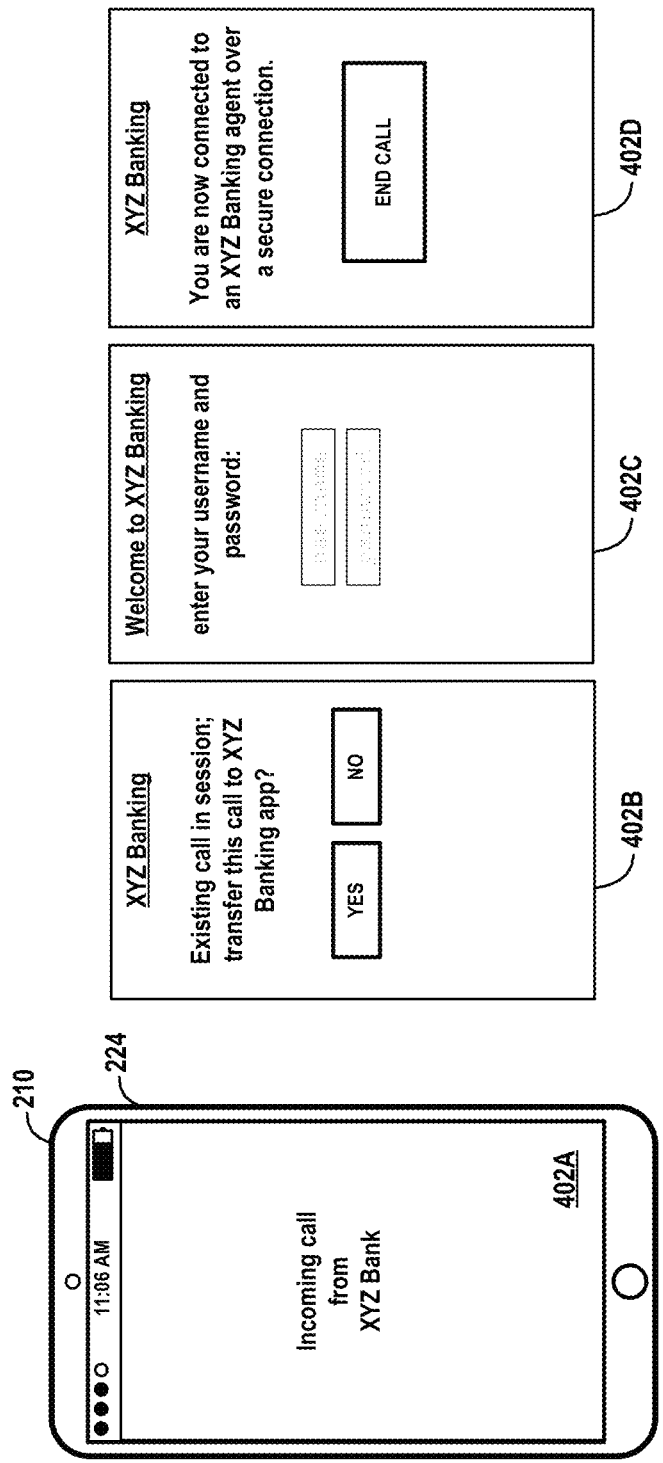
FIG. 4 is a conceptual diagram illustrating an example device that establishes a secure voice call session after receiving an unsolicited call from another party, in accordance with one or more aspects of the present disclosure.

FIG. 4 is a conceptual diagram illustrating an example device that establishes a secure voice call session after receiving an unsolicited call from another party, in accordance with one or more aspects of the present disclosure. FIG. 4 illustrates device 210 having display 224. Device 210 and display 224 may correspond to device 210 and display 224 of FIG. 2, respectively.

FIG. 4 illustrates example user interfaces (user interface 402A, user interface 402B, user interface 402C) presented by device 210. Although the user interfaces illustrated in FIG. 3 are shown as graphical user interfaces, other types of interfaces may be presented in other examples, including a text-based user interface, a console or command-based user interface, a voice prompt user interface, or any other appropriate user interface. One or more aspects of the user interfaces illustrated in FIG. 4 may be described herein within the context of system 200 of FIG. 2.

In the example of 4, and in accordance with one or more aspects of the present disclosure, device 210 may receive an unsolicited call. For instance, in the example of FIG. 4, a user of device 210 may receive an unsolicited call, and device 210 may present user interface 402A. In such a situation, since the call was unsolicited, the user of device 210 might not trust the caller, and may seek to convert the call into a secure call.

Device 210 may convert an existing insecure call to a secure call. For instance, in the example of FIG. 4, presence-sensitive panel 222 detects input that banking module 238 determines corresponds to a request to transfer the call or convert the call to a secure call managed by banking module 238. In response, banking module 238 causes display 224 to present user interface 402B. Presence-sensitive panel 222 detects input that banking module 238 determines corresponds to valid authentication credentials, which may have been entered in response to user interface 402C. Banking module 238 causes 215 to output a signal over network 105. Communication unit 245 of computing system 240 detects a signal that banking module 258 determines corresponds to a request to initiate a secure VOIP call. Computing system 240 causes a call to be initiated to device 210 in the manner previously described. Banking module 238 eventually receives an indication of an incoming call from computing system 240. Banking module 238 verifies that device 210 actually requested the call. If so, banking module 238 connects the call, presents user interface 402D, and the call continues. In some examples, the new VOIP call replaces the original call, and the original call is terminated. In some examples, the original unsolicited call may be a conventional voice call, although in other examples, the original unsolicited call may be a VOIP call.

Banking module 238 may also verify that computing system 240 is the other party to the call. To do so, banking module 238 may consult a certificate authority and determine whether a digital certificate presented by computing system 240 prior to or during the VOIP call is sufficient to certify that XYZ Bank is the other party to the VOIP call. If so, the call session continues or is enabled. If not, banking module 238 may connect the call, but present a user interface indicating that the call is not secure. In other examples, if the digital certificate is not sufficient, banking module 238 may prevent the call from being connected or if connected, may cause voice module 232 to terminate the call session.

Figure 5:
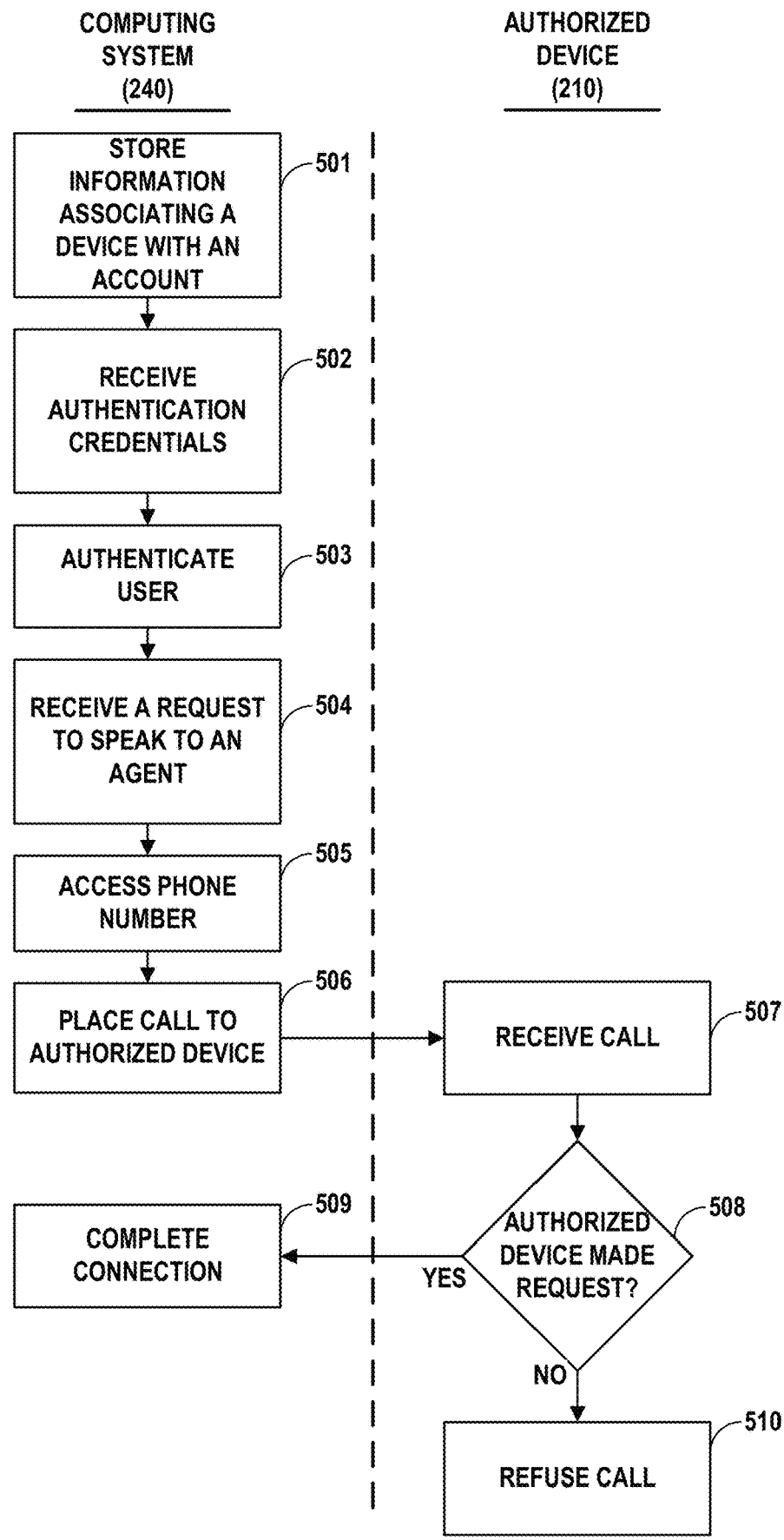
FIG. 5 is a flow diagram illustrating an example process for establishing a voice call session between an example device and a call center in accordance with one or more aspects of the present disclosure.

FIG. 5 is a flow diagram illustrating an example process for establishing a voice call session between an example device and a call center in accordance with one or more aspects of the present disclosure. The process of FIG. 5 is illustrated from two different perspectives: operations performed by an example computing system 240 (left-hand column to the left of dashed line), and operations performed by an example device 210 (right-hand column to the right of dashed line). The device 210 may be, for example, a mobile phone or a mobile device.

In the example of FIG. 5, the illustrated process may be performed by system 200 in the context illustrated in FIG. 2. In other examples, different operations may be performed, or operations described in FIG. 5 as being performed by a particular component, module, system, and/or device may be performed by one or more other components, modules, systems, and/or devices. Further, in other examples, operations described in connection with FIG. 5 may be performed in a difference sequence, merged, or omitted, even where such operations are shown performed by more than one component, module, system, and/or device.

In the example of FIG. 5, and in accordance with one or more aspects of the present disclosure, computing system 240 may store information associating a device with an account (501). For instance, in some examples, computing system 240 receives device identifying information for an authorized device that is or has been known to be used by an authenticated account holder. The device identifying information may be a MAC address or other information derived from the hardware of the device. Computing system 240 stores the identifying information in data store 259 in a manner that associates the device identifying information with the account, thereby classifying the device as "bound" to the account. Computing system 240 further stores a phone number associated with the bound device.

Computing system 240 may later receive authentication credentials (502). For instance, in some examples, after days, weeks, or months have passed since computing system 240 stored the device identifying information in data store 259, communication unit 245 of computing system 240 detects a signal over network 105 from a user device. Communication unit 245 outputs to banking module 258 an indication of the signal. Banking module 258 determines that signal includes authentication credentials.

Computing system 240 may authenticate the user (503). For instance, in some examples, banking module 258 compares the authentication credentials included within the signal to authentication credentials stored in data store 259. Banking module 258 determines that the credentials match sufficiently. Banking module 258 therefore concludes that the user device is operated by an authenticated user.

Computing system 240 may receive a request to speak to an agent (504). For instance, in some examples, banking module 258 receives an indication of a signal received over network 105 from the user device. Banking module 258 determines that the signal includes a request, made by the user, to speak to an agent.

Computing system 240 may access a phone number associated with the user's account (505). For instance, in some examples, banking module 258 accesses information within data store 259. Banking module 258 identifies a phone number associated with the authorized device. The phone number might not be the phone number associated with the user device, however.

Computing system 240 initiates a call to the authorized device (506). For instance, in some examples, banking module 258 outputs information to voice module 252. Voice module 252 uses the information to cause a signal to be sent over network 105, corresponding to a VOIP call being initiated to the identified phone number.

Device 210 receives the call (507). For instance, in some examples, communication unit 215 of device 210 detects a signal that it determines corresponds to an incoming VOIP call. Communication unit 215 outputs to banking module 238 information about the incoming call.

Device 210 determines whether the authorized device made the request to speak to an agent (508). For instance, in some examples, banking module 238 verifies that device 210 actually requested the call (and that the call was not initiated by another unauthorized device). In some examples, banking module 238 may determine that the signal includes a code corresponding to a hardware identifier. In such an example, banking module 238 may verify that device 210 requested the call by determining whether the code matches hardware identifier 235. In other examples, banking module 238 may otherwise determine whether device 210 is the user device that sent the request at block 504.

Device 210 connects the call, causing computing system 240 to complete the connection to the agent (509). For instance, in some examples, banking module 238 outputs to voice module 232 information about the signal. Voice module 232 connects the call. Computing system 240 detects the connection and manages the call while the user of device 210 engages in a conversation with the agent. If, however, banking module 238 cannot verify that it initiated the request to speak to an agent, device 210 may refuse the call (510).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   storing, by a computing system, information associating an authorized device with an account, wherein the information includes a phone number associated with the authorized device;
   determining, by the computing system and based on information received over a network from a device operated by a user, that the user is authorized to access the account;
   receiving, by the computing system over the network and from the device, a request to engage in a voice conversation, wherein the request to engage in a voice conversation is generated by the device in response to call request input detected by the device;

responsive to receiving the request, accessing, by the computing system, the phone number associated with the authorized device;
initiating, by the computing system, a voice session with the authorized device, wherein initiating the voice session includes placing a call, over the network, to the phone number associated with the authorized device;
receiving, over the network and by the authorized device, an indication of the call; and
responsive to receiving the indication of the call, evaluating, by the authorized device, whether the device operated by the user is the authorized device, wherein evaluating includes accessing data stored on the authorized device to verify that the authorized device generated the request to engage in a voice conversation.

2. The method of claim 1, further comprising:
responsive to determining that the device operated by the user is not the authorized device, refusing, by the authorized device, the call.

3. The method of claim 2, wherein determining that the device operated by the user is not the authorized device includes:
determining that the authorized device did not send the request to engage in a voice conversation.

4. The method of claim 1, further comprising:
responsive to determining that the device operated by the user is the authorized device, connecting, by the authorized device, the call.

5. The method of claim 4, wherein determining that the device operated by the user is the authorized device includes:
determining that the authorized device sent the request to engage in a voice conversation.

6. The method of claim 4, further comprising:
presenting, by the authorized device, a user interface that suggests that the call was placed by the authorized device.

7. The method of claim 4, further comprising:
receiving, by the computing system and from the device operated by the user, contextual information identifying a context in which the request was made, wherein the contextual information is derived from interactions detected by the device prior to the call request input detected by the device; and
routing, by the computing system, the voice call session based on the contextual information.

8. The method of claim 4, further comprising:
monitoring, by the computing system, the call for fraud indicators;
logging, by the computing system, information about the call;
terminating, by the computing system, the call; and
after terminating the call, analyzing, by the computing system, the logged information about the call for further fraud indicators.

9. The method of claim 1, wherein determining that the user is authorized to access the account includes:
receiving authentication credentials identifying the device operated by the user;
receiving information identifying the device operated by the user; and
determining, based on the authentication credentials and the information identifying the device operated by the user, that the user is authorized to access the account.

10. The method of claim 1, further comprising:
receiving, by the computing system and from the device operated by the user, contextual information identifying a context in which the request was made, wherein the contextual information is derived from interactions detected by the device prior to the call request input detected by the device.

11. A system comprising:
an authorized device; and
a computing system configured to perform operations comprising:
storing information associating an authorized device with an account, wherein the information includes a phone number associated with the authorized device,
determining, based on information received over a network from a device operated by a user, that the user is authorized to access the account,
receiving, over the network and from the device, a request to engage in a voice conversation, wherein the request to engage in a voice conversation is generated by the device in response to call request input detected by the device,
responsive to receiving the request, accessing the phone number associated with the authorized device, and
initiating a voice session with the authorized device, wherein initiating the voice session includes placing a call, over the network, to the phone number associated with the authorized device,
wherein the authorized device is configured to perform operations comprising:
receiving, over the network, an indication of the call, and
responsive to receiving the indication of the call, evaluating whether the device operated by the user is the authorized device, wherein evaluating includes accessing data stored on the authorized device to verify that the authorized device generated the request to engage in a voice conversation.

12. The system of claim 11, wherein the authorized device is further configured to perform operations comprising:
responsive to determining that the device operated by the user is not the authorized device, refusing the call.

13. The system of claim 12, wherein determining that the device operated by the user is not the authorized device includes:
determining that the authorized device did not send the request to engage in a voice conversation.

14. The system of claim 11, wherein the authorized device is further configured to perform operations comprising:
responsive to determining that the device operated by the user is the authorized device, connecting the call.

15. The system of claim 14, wherein determining that the device operated by the user is the authorized device includes:
determining that the authorized device sent the request to engage in a voice conversation.

16. The system of claim 14, wherein the authorized device is further configured to perform operations comprising:
presenting a user interface that suggests that the call was placed by the authorized device.

17. The system of claim 14, wherein the computing system is further configured to perform operations comprising:
receiving, from the device operated by the user, contextual information identifying a context in which the request was made, wherein the contextual information is derived from interactions detected by the device prior to the call request input detected by the device; and routing the voice call session based on the contextual information.

18. The system of claim 14, wherein the computing system is further configured to perform operations comprising:
   monitoring the call for fraud indicators;
   logging information about the call;
   terminating the call; and
   after terminating the call, analyzing the logged information about the call for further fraud indicators.

19. The system of claim 11, wherein determining that the user is authorized to access the account includes:
   receiving authentication credentials identifying the device operated by the user;
   receiving information identifying the device operated by the user; and
   determining, based on the authentication credentials and the information identifying the device operated by the user, that the user is authorized to access the account.

20. A computing system comprising a storage system and processing circuitry, wherein the processing circuitry is configured to access the storage system and perform operations comprising:
   storing information associating an authorized device with an account, wherein the information includes a phone number associated with the authorized device;
   determining, based on information received over a network from a device operated by a user, that the user is authorized to access the account;
   receiving, over the network and from the device, a request to engage in a voice conversation, wherein the request to engage in a voice conversation is generated by the device in response to call request input detected by the device;
   responsive to receiving the request, accessing the phone number associated with the authorized device;
   initiating a voice session with the authorized device, wherein initiating the voice session includes placing a call, over the network, to the phone number associated with the authorized device;
   enabling the authorized device to receive, over the network, an indication of the call; and
   enabling the authorized device to, responsive to receiving the indication of the call, evaluate whether the device operated by the user is the authorized device, wherein to evaluate, the authorized device accesses data stored on the authorized device to verify that the authorized device generated the request to engage in a voice conversation.

* * * * *